A. RANKIN.
Hinges.

No. 137,623.

Patented April 8, 1873.

Witnesses, Harry Smith
Thomas McIlvain

A. Rankin
By his Attys,
Howson and Son.

UNITED STATES PATENT OFFICE.

ANDREW RANKIN, OF PHILADELPHIA, PENNSYLVANIA.

IMPROVEMENT IN HINGES.

Specification forming part of Letters Patent No. 137,623, dated April 8, 1873; application filed February 27, 1873.

*To all whom it may concern:*

Figure 1:
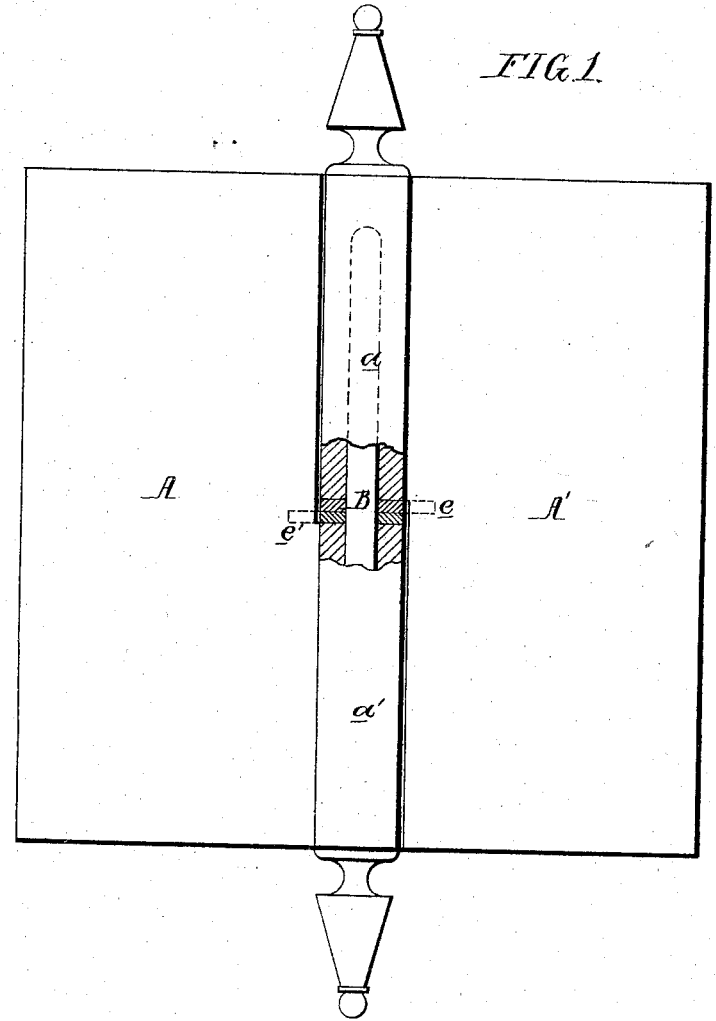
Figure 2:

Be it known that I, ANDREW RANKIN, of the city and county of Philadelphia, State of Pennsylvania, have invented an Improvement in Hinges, of which the following is a specification:

The object of my invention is to prevent the rapid wearing and consequent deterioration of bronze hinges, such as are used for heavy doors; and this object I attain by interposing between the two halves, A and A' of the hinge, two hardened steel rings, $e$ and $e'$, surrounding the pivot-pin B, as shown in Figure 1 of the accompanying drawing, one ring being connected to and turning with each half of the hinge, so that the soft metal of the latter shall be protected by the hard-steel rings, to which the friction is confined, and by which the friction is diminished.

Ornamental hinges of bronze, of the character illustrated in the drawing, are extensively used in connection with heavy doors, each hinge consisting of two halves, A and A', the hub $a$ of one half attached to the door having a pivot, B, projecting into the hub $a'$ of the other half of the hinge attached to the door-frame. The weight which the hub $a'$ has to support and the constant movement of the hinge cause such friction of the hubs where they meet that the soft metal soon becomes worn to an extent which renders the hinge imperfect.

Attempts have been made to obviate this difficulty by interposing a loose washer of steel between the two hubs; but this only partially remedied the evil, for friction against one or other or both of the hubs of soft metal was inevitable in spite of the washer.

By connecting one steel ring, $e$, to the hub of one-half the hinge, and a similar ring, $e'$, to the hub of the other half of the hinge, not only is the soft metal effectually protected from the effect of friction, but the latter is reduced, owing to the bearing of one hard steel surface against another surface of like character.

Different plans may be adopted of connecting the rings to the hinge. In the present instance each ring has a pointed projection, $x$, which fits into a recess in the metal of that half of the hinge with which the ring has to turn.

I claim as my invention—

The hard-steel rings $e$ and $e'$ interposed between the two hubs of the hinge and connected one to each half of the hinge, all as and for the purpose herein set forth.

In testimony whereof I have signed my name to this specification in the presence of two subscribing witnesses.

ANDREW RANKIN.

Witnesses:
 WM. A. STEEL,
 HUBERT HOWSON.